United States Patent
Miyake

(10) Patent No.: US 7,352,288 B2
(45) Date of Patent: Apr. 1, 2008

(54) APPARATUS AND METHOD FOR PREVENTING MALFUNCTION OF REMOTE CONTROLLER

(75) Inventor: Takashi Miyake, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 365 days.

(21) Appl. No.: 10/864,302

(22) Filed: Jun. 9, 2004

(65) Prior Publication Data

US 2005/0017872 A1 Jan. 27, 2005

(30) Foreign Application Priority Data

Jun. 19, 2003 (JP) ............................. 2003-174461

(51) Int. Cl.
*G08C 19/00* (2006.01)

(52) U.S. Cl. .......................... 340/825.72; 340/825.24; 340/825.25; 340/825.22; 340/5.61; 340/5.64; 340/5.74; 340/825.69; 341/176; 341/174

(58) Field of Classification Search .......... 340/825.24, 340/825.25, 825.72, 825.69, 5.61, 5.64, 5.74; 348/734; 398/112; 341/176, 174; 712/226
See application file for complete search history.

(56) References Cited

U.S. PATENT DOCUMENTS

| | | | | |
|---|---|---|---|---|
| 4,814,741 A | * | 3/1989 | Hongo et al. | 340/825.65 |
| 5,128,668 A | | 7/1992 | Ikezaki et al. | |
| 5,579,496 A | * | 11/1996 | Van Steenbrugge | 712/226 |

* cited by examiner

*Primary Examiner*—Brian Zimmerman
*Assistant Examiner*—Vernal Brown
(74) *Attorney, Agent, or Firm*—Brinks Hofer Gilson & Lione

(57) ABSTRACT

A malfunction of interpreting one remote control operation as a plurality of remote control operations by mistake is prevented without impairing the responsiveness of a remote controller. A counter code which is updated each time a key of the remote controller is operated is added to a remote control signal. If an electronic device acquires the remote control signal from a control bus, the counter code contained in the remote control signal is checked to determine whether or not a remote control signal having the same count has already been acquired from the remote control light reception unit. If such a remote control signal has already been acquired, the remote control signal acquired subsequently is invalidated. Consequently, it is possible to prevent the inconvenience of a plurality of operations from being carried out due to validated remote control signals subsequently obtained through the control bus, without setting a certain time period in which all signals are considered to be the same.

15 Claims, 5 Drawing Sheets

SYSTEM EXAMPLE WHICH APPLIED APPARATUS PREVENTING MALFUNCTION OF REMOTE CONTROLLER OF PRESENT EMBODIMENT

CONSTITUTION EXAMPLE OF REMOTE CONTROLLER

CONSTITUTION EXAMPLE OF REMOTE CONTROL SIGNAL

CONSTITUTION EXAMPLE OF ELECTRONIC APPARATUS ACCORDING TO PRESENT EMBODIMENT

OPERATION EXAMPLE OF PRESENT EMBODIMENT

ANOTHER OPERATION EXAMPLE OF PRESENT EMBODIMENT

FIG.8(a) PRIOR ART

REMOTE CONTROL LIGHT RECEPTION UNIT: A, A

CONTROL BUS: A

DETERMINATION OF VALIDITY: A, A (dashed)

CERTAIN TIME PERIOD USED FOR DETERMINING AS SAME REMOTE CONTROL SIGNAL

CERTAIN TIME PERIOD USED FOR DETERMINING AS SAME REMOTE CONTROL SIGNAL

A, B (dashed)

CERTAIN TIME PERIOD USED FOR DETERMINING AS SAME REMOTE CONTROL SIGNAL

APPARATUS AND METHOD FOR PREVENTING MALFUNCTION OF REMOTE CONTROLLER

BACKGROUND OF THE INVENTION

1. Field of the Invention

The present invention relates to an apparatus for preventing malfunction of a remote controller, an electronic device and a remote control transmitter provided with a function of preventing malfunction of a remote controller, and a method for preventing malfunction of a remote controller, and more particularly relates to the art of preventing malfunction when a plurality of electronic devices connected to a common control bus are controlled by using remote controllers.

2. Description of the Prior Art

In general, various types of electronic devices such as a CD player, a DVD player, an MD player, a cassette deck, a radio tuner, a television receiver, and a navigation apparatus are accompanied by a remote controller, and operations of these electronic devices are controlled remotely. Recently, there are increasing cases where a plurality of electronic devices is provided at home or in a vehicle, and thus, the number of electronic devices to be remotely controlled is increasing.

For example, head units which can reproduce Audio Visual (AV) sources such as a CD, a DVD, an MD, a cassette tape, a radio and the like, a television receiver, and a navigation apparatus are installed in the vehicle passenger cabin. These electronic devices are respectively accompanied by a dedicated remote controller, and are also respectively provided with a light reception unit for an infrared remote control signal. In one case, a television receiver and a navigation apparatus share one monitor, and a light reception unit is provided on the monitor thereof. In this case, a remote controller may be shared.

In this situation, when one wishes to control an electronic device, one should operate a remote controller, which is dedicated to the electronic device to be controlled, and is directed to a remote control light reception unit provided on the electronic device. However, it is considerably annoying to change the direction of the remote controller each time according to where the electronic device to be controlled is installed.

Especially in an environment where a plurality of electronic devices may be installed in a small space such as a vehicle passenger cabin, it is necessary to install the electronic devices close to each other. In some cases, a remote control light reception unit of one electronic device is blocked by another electronic device, and thus, the remote control signal may not be properly received. Indeed, a monitor is often installed above a head unit installed in a console, and a remote control light reception unit of the head unit is often blocked by the monitor.

Conventionally, in order to solve this problem, there is a proposed system where a plurality of electronic devices provided with a remote control light reception unit are connected with each other through a common control bus, and the respective electronic devices communicate a remote control signal with each other (see, for example, Japanese Patent No. 2506969).

In this type of system, a remote control signal received by one electronic device using its own remote control light reception unit is transmitted to other electronic devices through the control bus. The remote control signal contains a code specifying an electronic device to be controlled, and thus, the electronic device specified by this code can operate in response to this remote control signal. In this way, as long as at least one of the plurality of remote control light reception units receives a remote control signal, all the electronic devices can receive this remote control signal, thereby increasing the capability of receiving a remote control signal.

According to the prior art described above, the respective electronic devices connected to the control bus may receive the same remote control signals both from its own remote control light reception unit and the control bus. Also, these respective electronic devices may receive a remote control signal either from its own remote control light reception unit or the control bus depending on conditions such as the direction of the remote controller, the intensity of the light, and the location of the remote control light reception unit. Consequently, the respective electronic devices carry out processing based on both the remote control signals received from the remote control light reception unit and the remote control signals received from other electronic devices through the control bus.

However, the remote control signal from the control bus is transmitted on the control bus after the remote control light reception unit of another electronic device receives the signal, and thus, is delayed with respect to the remote control signal received by its own remote control light reception unit. Especially, as a characteristic of the control bus, if the traffic is high on the control bus, a remote control signal cannot be transmitted immediately, possibly resulting in an increased delay. At the same time, remote control signals acquired from the same control bus may present an interval in the arrival depending on the transmission states of the respective electronic devices. For example, if a large amount of data is already present in a transmission buffer of the electronic device, it may take a long time before the remote control signal can be transmitted.

If the electronic device receives the remote control signals arriving respectively from its own remote control light reception unit and from the control bus with an interval between them in this way, the remote control is carried out twice (the system considers that the same operation is instructed twice) although these remote control signals are generated from an operation instructed only once.

As a result, for example, even if an operation of turning up a sound volume is instructed only once, the sound volume will be turned up by two steps. As for an operation of turning on/off the power supply or various functions, an operation instructed only once will be carried out twice, and consequently, even if a user intends to turn on the power supply, the power supply will be turned off immediately after it is turned on, for example. This phenomenon appears to be an apparent malfunction to the user.

To avoid such a malfunction, as shown in FIG. 8(a), it may be possible to employ a processing method such that a plurality of remote control signals received in a certain time period are considered to be the same remote control signal, and remote control signals received after the first remote control signal are disregarded.

It should be noted that the delay of the remote control signal arriving from the control bus changes depending on the traffic of the control bus and the transmission state of the electronic device on the sending side as described above, and thus, a long delay may be generated. In this case, if the time period in which all the received remote control signals are considered to be identical is set short, as shown in FIG. 8(b), the same remote control signal acquired from the control bus after a long delay may be considered as a different remote control signal, and the remote control signal arriving subsequently may be validated. Therefore, this certain time period must be set to a longer time period including a certain margin.

However, when the time period in which all the received remote control signals are considered to be the same is set too long, as shown in FIG. 8(c), although the user may actually operate the remote controller a plurality of times, the remote control signals corresponding to the subsequent operations are all considered as invalid, and only the first operation will be acknowledged. As a result, there is the problem that the user has an impression that the responsiveness of the remote controller is inferior, and thus, it is extremely difficult to operate the remote controller.

SUMMARY OF THE INVENTION

The present invention is devised to solve these problems, and is intended to prevent the apparent malfunction of mistakenly performing a remote control operation a plurality of times when the remote control operation is instructed only once, without impairing the responsiveness of the remote controller.

To solve the above problems, according to the present invention, in a system including a plurality of electronic devices provided with a remote control light reception unit, are connected to a common control bus, and mutually communicate remote control signals with each other through the control bus, a counter code is added to an ordinary remote control signal. A count which changes each time a key of a remote controller is operated is set to the counter code. If the electronic device acquires this remote control signal, the electronic device refers to the counter code contained in the remote control signal, determines whether the device has already acquired a remote control signal which satisfies a certain condition relating to the counter code, and invalidates the remote control signal acquired at the present time if such a remote control signal has already been acquired.

The certain condition relating to the counter code can mean that a count C1 of the counter code contained in the remote control signal acquired at the present time from the control bus and a count C2 of the counter code contained in the remote control signal already acquired are the same, for example. The past count C2 to be compared with the count C1 for the present time may be, for example, a count contained in a remote control signal acquired last time from the remote control light reception unit.

According to the present invention, after an electronic device acquires a remote control signal from the remote control light reception unit, if the electronic device acquires the same remote control signal from the control bus after a delay and both of the remote control signals have the same counter code, the remote control signal acquired subsequently from the control bus is invalidated. Consequently, it is possible to avoid the malfunction that causes the electronic device to carry out the instructed operation a plurality of times as a result of the remote control operation being carried out only once.

In another aspect of the present invention, the certain condition relating to the counter code can mean that the count C1 of the remote control signal acquired from the control bus and the count C2 of the remote control signal already acquired from the remote control light reception unit are the same, and counts of a plurality of the remote control signals acquired before the acquisition of the remote control signal from the control bus are used as the count C2 to be compared with the count C1.

Alternatively, the certain condition relating to the counter code may require the above-described count C1 and count C2 to satisfy either of the following relationships:

"$C2 \geq C1 \geq C2-n$ (where "$n$" is an arbitrary positive number)" (if the count is counted up by one), or "$C2 \leq C1 \leq C2+n$ (where "$n$" is an arbitrary positive number)" (if the count is counted down by one).

If there is provided a certain time period for the condition relating to the count for invalidating the remote control signal acquired from the control bus as described above, even if there is a long delay between the acquisition of the remote control signal from the remote control light reception unit and the acquisition of the same remote control signal from the control bus, and the user actually operates the remote controller a plurality of times in the delay (even if a remote control signal having a different count resulting from a remote control operation for a second or a subsequent time is received earlier in the delay), it is still possible to invalidate the remote control signal acquired from the control bus after the long delay.

Additionally, it is not determined whether a remote control signal is valid or invalid based on by setting a certain time period in which all the remote control signals are considered as the same (by recognizing the plurality of remote control signals received in the certain time period as the same signal, and invalidating the remote control signals later than the first remote control signal) as in the conventional case, but it is determined based on the count of the counter code newly added to the remote control signal. Consequently, even if the remote controller is operated a plurality of times in a time period shorter than the delay caused by routing the signal through the control bus, all of these operations are validated, and thus, the control is carried out normally. As a result, it is also possible to avoid the inconvenience of impaired responsiveness of the remote controller.

BRIEF DESCRIPTION OF THE DRAWINGS

FIGS. 8(a) through (c) are timing charts showing an example of conventional operation.

DETAILED DESCRIPTION OF THE PREFERRED EMBODIMENTS

Figure 1:
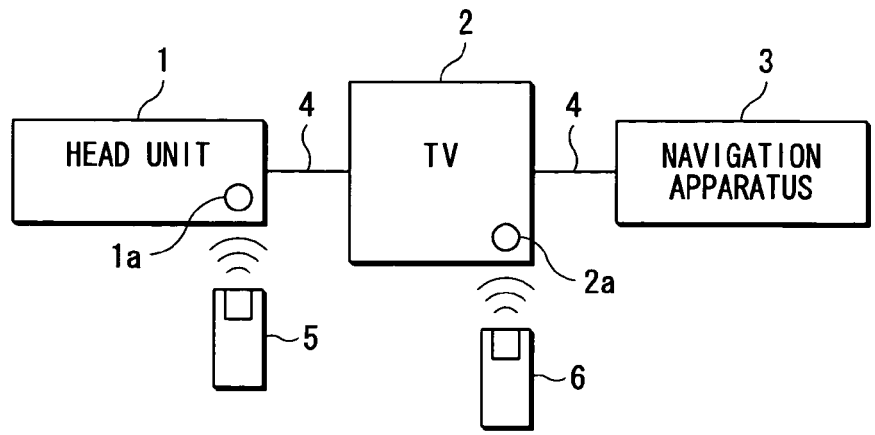
FIG. 1 is a block diagram of an example of an onboard vehicle system to which an apparatus preventing malfunction of a remote controller according to a present embodiment may be applied.

A description will now be given of an embodiment of the present invention by reference to the drawings. FIG. 1 is a block diagram of an example of an onboard vehicle system to which an apparatus preventing malfunction of a remote controller according to the present embodiment may be applied. The vehicle system shown in FIG. 1 is provided with a head unit 1 which can reproduce AV sources such as a CD, a DVD, an MD, a cassette tape, a radio and the like, a television receiver 2, and a navigation apparatus 3 providing travel guidance for the vehicle (all of these parts correspond to electronic devices according to the present invention), and the system is realized by connecting these parts to a common control bus 4.

The head unit 1 is provided with a remote control light reception unit 1a for receiving a remote control signal such as by infrared light. The television receiver 2 is provided with a remote control light reception unit 2a for receiving a remote control signal such as by infrared light. Although the navigation apparatus 3 is not provided with a remote control light reception unit in the example shown in FIG. 1, a remote control light reception unit may be provided.

The head unit 1 is accompanied by a remote controller 5, and the television receiver 2 is accompanied by a remote controller 6. In the example shown in FIG. 1, although the remote controller 6 used for the television receiver 2 is shared with the navigation apparatus 3, a dedicated remote controller may be used for the navigation apparatus 3. These remote controllers 5 and 6 may be operated by directing either to the remote control light reception unit 1a or 2a.

The remote control signal received by the remote control light reception units 1a and 2a is mutually communicated between the respective electronic devices 1 through 3 over the control bus 4. For example, the remote control signal received by the remote control light reception unit 1a of the head unit 1 is transmitted to the television receiver 2 and the navigation apparatus 3 through the control bus 4. In addition, the remote control signal received by the remote control light reception unit 2a of the television receiver 2 is transmitted to the head unit 1 and the navigation apparatus 3 through the control bus 4.

The head unit 1 and the television receiver 2 are often installed close to each other in a vehicle passenger cabin. Therefore, for example, even if the remote controller 5 is operated by directing it to the remote control light reception unit 1a of the head unit 1, two of the remote control light reception units 1a and 2a may receive the same remote control signal. On this occasion, the remote control signal received by the remote control light reception unit 2a of the television receiver 2 is transmitted to the head unit 1 through the control bus 4. In this case, the head unit 1 receives the remote control signal directly reaching the remote control light reception unit 1a and the remote control signal transmitted through the control bus 4 from the television receiver 2.

Figure 2:
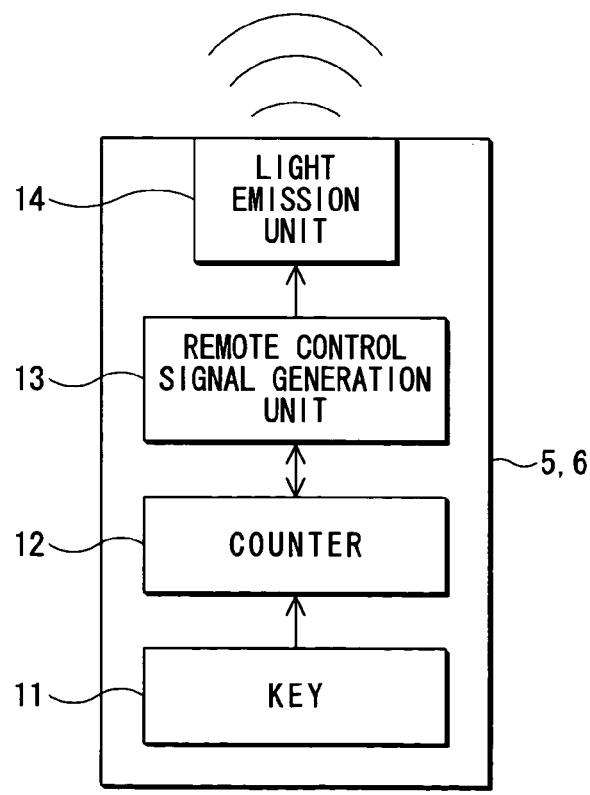
FIG. 2 is a block diagram of an example of a remote controller according to the present embodiment.

FIG. 2 is a block diagram showing an example of the remote controllers 5 and 6. As FIG. 2 shows, the remote controllers 5 and 6 according to the present embodiment may include a plurality of keys 11, a counter 12, a remote control signal generation unit 13, and a remote control light emission unit 14. The keys 11 are operators for sending various types of information to the electronic devices 1 through 3, and for carrying out various operations.

The counter 12 generates a count which changes each time the key 11 is operated. The counter 12 may have the data length of one byte, for example, and counts from 0 up to 255 by one each time the key 11 is operated. After the count reaches the maximum value of 255, the count returns to 0, and then the count begins again.

Figure 3:
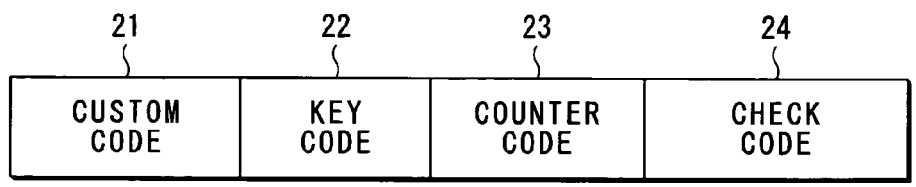
FIG. 3 shows an example of a remote control signal according to the present embodiment.

The remote control signal generation unit 13 generates the remote control signal containing a counter code specifying the count generated by the counter 12 when the key 11 is operated. FIG. 3 shows an example of the remote control signal generated by the remote control signal generation unit 13 according to the present embodiment. As FIG. 3 shows, the remote control signal according to the present embodiment includes a custom code 21 specifying a company as a user, a key code 22 specifying the type of key 11 operated, the counter code 23 specifying the count described above, and a check code 24 used for checking whether the data are normal.

The remote control light emission unit 14 emits the remote control signal generated by the remote control signal generation unit 13 as infrared light. The remote control light emission unit 14 and the remote control signal generation unit 13 constitute a remote control signal transmission unit according to the present invention.

Figure 4:
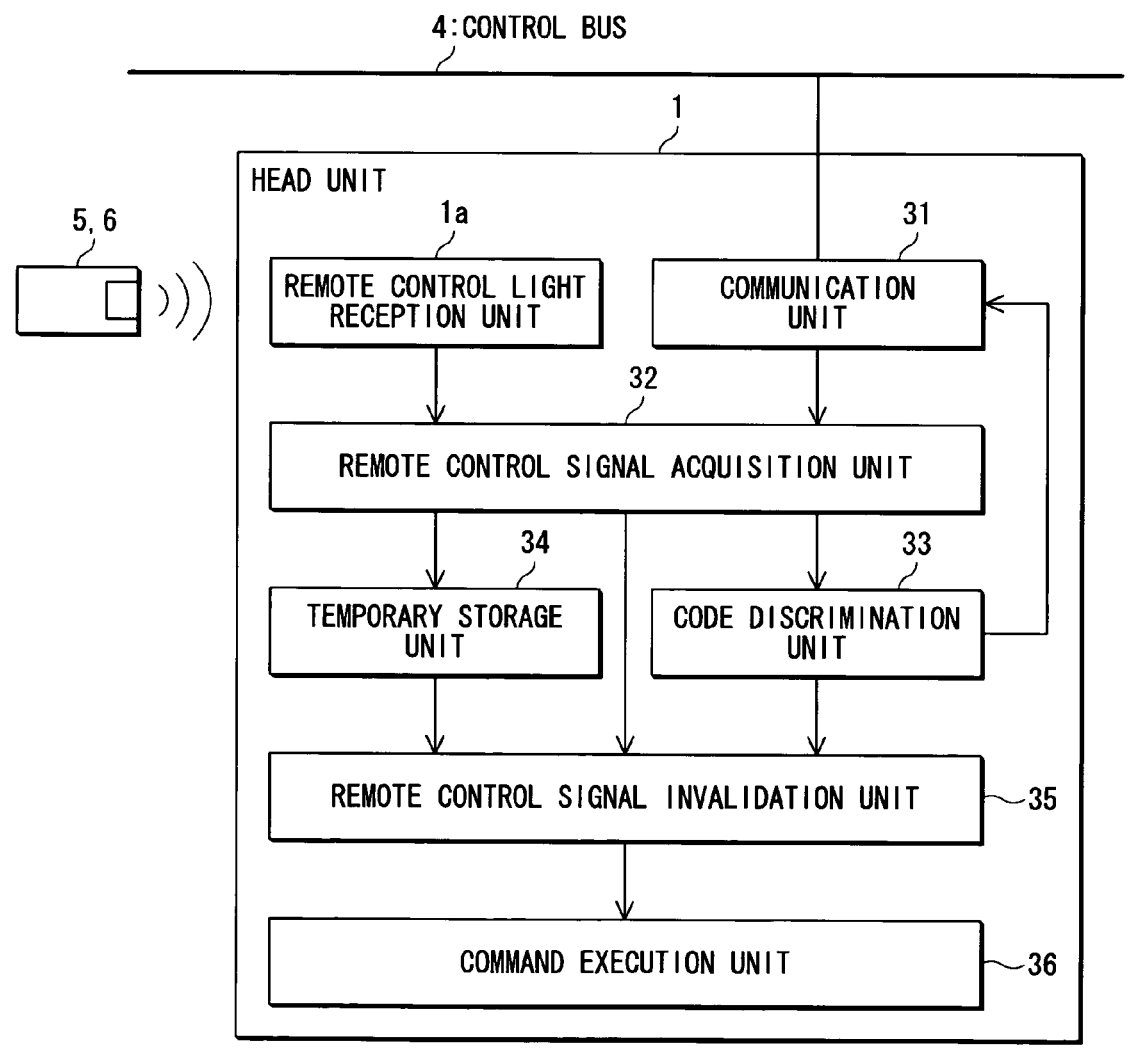
FIG. 4 is a block diagram showing an example of a principal part of an electronic device according to the present embodiment.

A description will now be given of the configurations of the head unit 1 and the television receiver 2 respectively provided with the remote control light reception units 1a and 2a. FIG. 4 is a block diagram showing a principal part of the head unit 1. It should be noted that although the description will be given of the configuration of the head unit 1, the television receiver 2 is configured in the same way.

In FIG. 4, a communication unit 31 communicates various types of data, including the remote control signal, with other electronic devices (the television receiver 2 and the navigation apparatus 3) through the control bus 4. The remote control signal acquisition unit 32 acquires the remote control signals through the remote control light reception unit 1a and the communication unit 31.

A code discrimination unit 33 refers to the key code 22 contained in a remote control signal acquired from the remote control light reception unit 1a by the remote control signal acquisition unit 32 and determines whether the acquired remote control signal is addressed to that device. If the acquired remote control signal is not addressed to that device, the remote control signal is sent out to the control bus 4 from the communication unit 31. If the acquired remote control signal is addressed to that device, the processing described below is carried out.

A temporary storage unit 34 temporarily stores the remote control signal acquired from the remote control light reception unit 1a by the remote control signal acquisition unit 32. The number of stored remote control signals is one, for example, and the contents stored in the temporary storage unit 34 are updated each time a new remote control signal is received from the remote control light reception unit 1a.

If the remote control signal acquisition unit 32 acquires the remote control signal from the control bus 4 (communication unit 31), a remote control signal invalidation unit 35 compares the counter code contained in the remote control signal acquired from the control bus 4 to the counter code contained in the remote control signal acquired the previous time from the remote control light reception unit 1a, and stored in the temporary storage unit 34.

If it is determined that the counts specified by both of the counter codes are the same, processing is carried out for invalidating the remote control signal acquired from the control bus 4 (i.e., the remote control signal is not supplied to a command execution unit 36). On the other hand, if it is determined that the counts are not the same, the currently received remote control signal is treated as valid and is supplied to the command execution unit 36. The command execution unit 36 executes the processing specified by the supplied remote control signal.

In the head unit 1 as described above, the remote control signal acquisition unit 32, the temporary storage unit 34, and the remote control signal invalidation unit 35 constitute an apparatus for preventing malfunction of a remote controller according to the present embodiment.

Figure 5:
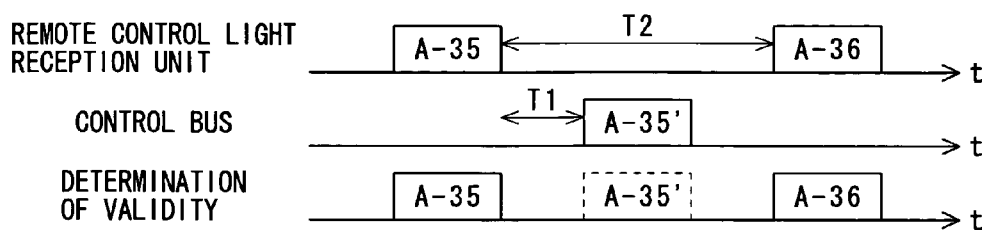
FIG. 5 is a timing chart showing an example of the operation of apparatus preventing malfunction of a remote controller according to the present embodiment.

FIG. 5 is a timing chart showing the operation of an example of the apparatus for preventing malfunction of a remote controller as described above. In a character string such as "A-35" shown in FIG. 5, "A" indicates the type of the key code 22, and "35" indicates the count of the counter code 23. The prime designation for a character string indicates a remote control signal which is the same as a remote control signal acquired from the remote control light reception unit 1*a*, but acquired from the control bus 4.

As FIG. 5 shows, it is assumed that the remote control signal acquisition unit 32 acquires a remote control signal A-35 from the remote control light reception unit 1*a*, and then acquires the same remote control signal A-35' from the control bus 4 after a delay T1.

In this case, if the remote control signal acquisition unit 32 acquires the remote control signal A-35 from the remote control light reception unit 1*a* for the first time, the remote control signal invalidation unit 35 treats the first remote control signal A-35 as a valid signal. On this occasion, the remote control signal A-35 is stored in the temporary storage unit 34.

Then, if the remote control signal acquisition unit 32 acquires a remote control signal A-35' from the control bus 4, the counter code contained in the remote control signal A-35' coincides with the counter code contained in the remote control signal A-35 already stored in the temporary storage unit 34. The remote control signal invalidation unit 35 therefore invalidates the remote control signal A-35' acquired subsequently through the control bus 4.

Consequently, it is possible to avoid a malfunction causing the command execution unit 36 of the head unit 1 to execute a command a plurality of times although the remote controller has been operated only once.

If the user actually operates the remote controller twice, the remote control signal A-36 which is generated by the second operation of the remote controller, and hence is subsequently acquired by the remote control signal acquisition unit 32, has a count for the counter code 23 different from that stored in the temporary storage unit 34. Therefore, in this case, the remote control signal A-36 is determined as valid, and the control is carried out normally.

It should be noted that the example shown in FIG. 5 is valid if an arrival time interval T1 of the remote control signal (the difference in time between the acquisition of a remote control signal through the remote control light reception unit 1*a* and the acquisition of the same remote control signal from the control bus 4) is not larger than an operation time interval T2 between a plurality of the remote control operations. However, as shown in FIG. 6, if the arrival time interval T1 of the remote control signal is longer than the operation time interval T2 of the remote controller, a remote control signal which should be invalidated may be determined as valid.

Figure 6:
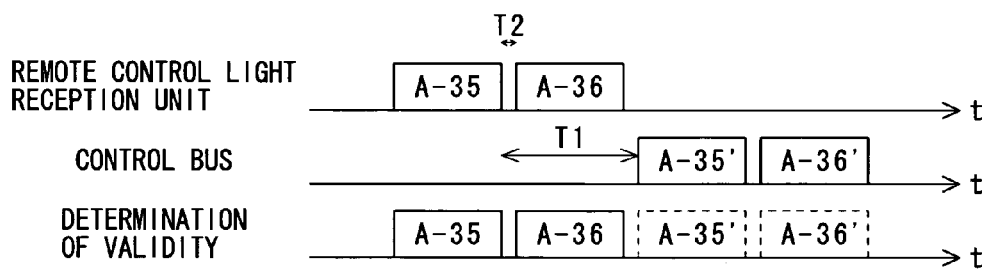
FIG. 6 is a timing chart showing another example of the operation of apparatus preventing malfunction of a remote controller according to the present embodiment.

As shown in FIG. 6, it is assumed that after the remote control signal A-35 is acquired through the remote control light reception unit 1*a*, the second remote control signal A-36 is acquired from the remote control reception unit 1*a* before the same remote control signal A-35' is acquired from the control bus 4. In this case, the comparison between the count of the remote control signal A-35' acquired subsequently through the control bus 4 and the count of the remote control signal A-36 stored in the temporary storage unit 34 results in disagreement. Therefore, the same remote control signal A-35' acquired subsequently through the control bus 4 is also determined as valid.

To avoid this malfunction, it is preferable that the remote control signal invalidation unit 35 uses the following condition as the condition for determining whether the remote control signal is valid or invalid. Namely, if the count C1 of the counter code contained in the remote control signal currently acquired from the control bus 4 and the count C2 of the counter code contained in the remote control signal previously acquired from the remote control light reception unit 1*a* satisfy a condition:

$$C2 \geq C1 \geq C2-n \text{ (where "}n\text{" is an arbitrary positive number)} \quad (1)$$

the remote control signal currently acquired from the control bus 4 is invalidated.

In the case shown in FIG. 6, if the remote control signal A-35' is acquired through the control bus 4, the remote control signal invalidation unit 35 refers to the count of this remote control signal A-35' and the count of the remote control signal A-36 already stored in the temporary storage unit 34, and then, determines whether the condition represented by the expression (1) holds. For example, if n=1, the expression is represented by "36≧35≧36−1", which satisfies the condition of the expression (1), and thus, the remote control signal A-35', which arrives subsequently through the control bus 4, is invalidated.

It should be noted that the value of "n" in the expression (1) may be set to a proper value considering the possibility that the remote control operation is carried out twice or more in the arrival time interval T1 of the remote control signal. For example, "n" may be set to 10. If "n" is set to 10, it is possible to surely invalidate the remote control signal arriving subsequently through the control bus 4 as long as the number of the remote control operations is up to ten in the arrival time interval T1 of the remote control signal.

Since it is determined whether the remote control signal is valid or invalid using the condition of the expression (1), even if the delay of the remote control signal becomes long, and the user actually operates the remote controller a plurality of times in the arrival time interval T1 starting from the acquisition of the remote control signal from the remote control light reception unit 1*a* to the acquisition of the same remote control signal from the control bus 4 (even if the remote control signals having a different count arrive earlier due to second and subsequent remote control operations carried out in the delay), it is possible to surely invalidate the remote control signal arriving through the control bus 4 after the long delay.

According to the present embodiment, it is not determined that a plurality of remote control signals received in a certain time period are considered as the same, and the remote control signals received subsequently are invalidated, but it is determined whether the remote control signal is valid or invalid based on the count of the counter code newly added to the remote control signal. Namely, it is not necessary to set a certain time period in which the received remote control signals are considered as the same as in the conventional art, and thus, even if the remote controller is operated a plurality of times in a time period shorter than the delay of the control bus 4, all of these operations are considered as valid, and consequently the control is carried out normally. As a result, it is also possible to avoid the inconvenience of the impaired responsiveness of the remote controller.

It should be noted that the above description is given of the example which uses the condition represented by the expression (1) where the counter 12 increments the count each time the key 11 of the remote controller is operated. The count of the counter 12 may be decremented each time the key 11 of the remote controller is operated, and in this case, it is determined whether the remote control signal is valid or invalid based on whether or not a condition represented by a following expression (2) holds:

$$C2 \leq C1 \leq C2+n \text{ ("}n\text{" is an arbitrary positive number)} \quad (2)$$

Figure 7A:
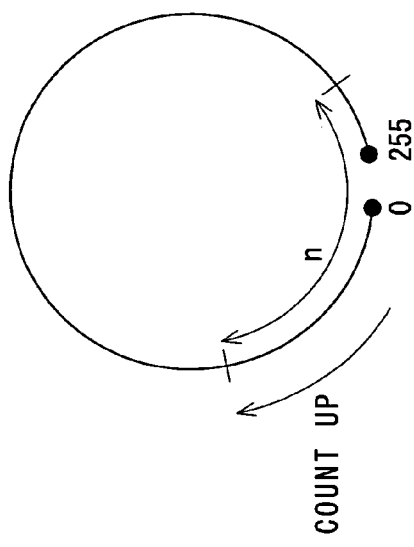
FIGS. 7(a) and (b) are timing charts showing another example of the operation of apparatus preventing malfunction of a remote controller according to the present embodiment.

If it is determined whether the remote control signal is valid or invalid using the condition represented by the expression (1) or (2), due to the property of the cyclic count, the determination may fail in the case of the simple numerical comparison. FIG. 7 describes this case. As FIG. 7(*a*) shows, at the timing when the count of the counter 12 reaches the maximum value "255", and then is counted up from "0" again, the range determined by "n" may extend across the maximum and minimum values of the counter 12.

For example, as shown in FIG. 7(*b*), at the time when the count of the counter 12 reaches the maximum value "255", and then is counted up from "0" again, the comparison between the count of a remote control signal A-254' arriving subsequently through the control bus 4, and the count of a remote control signal A-0 stored in the temporary storage unit 34 results in $0 \geq 254 \geq 0-10$ (if n=10), and thus, the condition of the expression (1) does not hold. Consequently, the remote control signal A-254' which should be invalidated is validated.

To overcome this problem, for example, it is determined whether the result of subtracting "n" from the count C2 of the remote control signal stored in the temporary storage unit 34 is negative or not, and if the result is negative, the maximum value "255" of the counter 12 is added to the count C2, and then it is determined whether the condition represented by expression (1) holds. In this case, the count of the remote control signal A-0 stored in the temporary storage unit 34 is added with "255" for determining whether or not the count of the remote control signal A-254' acquired subsequently through the control bus 4 satisfies the condition of expression (1), and consequently, the result is expressed as $255 \geq 254 \geq 255-10$, which satisfies the condition of the expression (1).

In place of the condition represented by expression (1) or (2), the following may be used. Namely, the remote control signal invalidation unit 35 determines whether or not the count C1 of the remote control signal acquired from the control bus 4 and the count C2 of the remote control signal acquired from the remote control light reception unit 1*a* and already stored in the temporary storage unit 34 are the same. At this point, the condition is the same as that described with reference to FIG. 5. However, it should be noted that counts of "n" of the remote control signals acquired before the remote control signal is acquired from the control bus 4 are used as the count C2 to be compared with the count C1.

Namely, the temporary storage unit 34 sequentially stores a sequence of "n" remote control signals acquired from the remote control light reception unit 1*a* by the remote control signal acquisition unit 32. If the remote control signal acquisition unit 32 acquires the remote control signal from the control bus 4, the remote control signal invalidation unit 35 compares the count C1 contained in the remote control signal currently acquired from the control bus 4 to the counts C2 respectively contained in the remote control signals for the last "n" times acquired from the remote control light reception unit 1*a* and stored in the temporary storage unit 34. Then, if it is determined that some of the "n" counts C2 are equal to the count C1, the remote control signal currently acquired from the control bus 4 is invalidated.

According to this approach, as in the case where the determination condition according to expression (1) or (2) is used, even if a plurality of the remote control operations are carried out in a time period shorter than the delay of the control bus 4, it is possible to surely invalidate duplicate remote control signals arriving through the control bus 4 after these operations. Also, it is possible to validate all of the plurality of remote control signals arriving from the remote control light reception unit 1*a*, thereby enabling normal control and avoiding the degradation of the responsiveness of the remote controller. In addition, it is not necessary to consider the property of the count which is cyclically counted, and thus the simple numerical comparison avoids a failure in the determination based on the condition.

It should be noted that since the data length of the counter 12 is one byte according to the present embodiment, operating the remote control 256 times is necessary for the same count to appear as a result of the cyclic count. However, the remote controller is hardly operated successively 256 times in the arrival time interval T1 between the acquisition of a remote control signal by the remote control light reception unit 1*a* and the acquisition of the same remote control signal from the control bus 4.

Thus, as described above, even if a certain margin is added to the condition of the count used for invalidating the remote control signal acquired from the control bus 4 (the validity of a remote control signal is determined based on the condition of expression (1) or (2), or the validity is determined according to "n" remote control signals stored in the temporary storage unit 34), remote control signals which are actually different hardly satisfy the conditions described above, and thus, are hardly determined as the same by mistake.

Basically, it is preferable to set the data length of the counter 12 (the counter code 23) as follows. Namely, the data length of the counter 12 is set such that the time required for a user to successively operate the key 11 of the remote controller a number of times equal to the maximum count represented by the data length, is longer than the expected longest time period of the arrival time interval T1 required for the remote control signal transmitted from one electronic device to another electronic device through the control bus 4.

It may be possible to set a certain time period in which all of the received remote control signals are considered as the same for preventing the malfunction by any chance. Namely, if a remote control signal is acquired from the control bus 4, it is determined whether or not the remote control signal acquired from the control bus 4 satisfies the certain condition relating to the counter code 23 only if the remote control signal is acquired within the certain time period after the acquisition of the last remote control signal stored in the temporary storage unit 34, thereby invalidating the remote control signal. In this case, although the certain time period depends on the data length of the counter 12, the certain time period may be set longer than that of the conventional case.

As detailed above, according to the present embodiments, since the remote control signal is supplemented with the counter code 23 whose count changes each time a key 11 of the remote controller is operated, and the electronic device determines whether the remote control signal is valid or invalid by determining whether or not the counter code 23 satisfies the certain condition, it is possible to prevent the malfunction of considering a remote control operation carried out once as the remote control operation carried out a plurality of times by mistake, without impairing the responsiveness of the remote controller.

It should be noted that although the remote control signals stored in the temporary storage unit 34 are limited to those acquired from the remote control signal reception unit 1a in the configuration shown in FIG. 4 according to the above-described embodiments, the remote control signals acquired from the control bus 4 may be stored as well. For example, there may be a case where the remote control signal is not acquired from the remote control light reception unit 1a, but the remote control signal is acquired only from the control bus 4 in the head unit 1. In this case, it is preferable to use the remote control signals acquired from the control bus 4 as the basis for determining the validity.

Namely, in the example shown in FIG. 1, although there are no electronic devices equipped with the remote control light reception unit other than the head unit 1 and the television receiver 2, it may be assumed that other electronic devices (such as the navigation apparatus 3 and another electronic device which are not shown) are equipped with a remote control light reception unit. In this case, in addition to the remote control signals from the television receiver 2, remote control signals from these other electronic devices may be transmitted to the head unit 1 through the control bus 4. On this occasion, it is preferable to compare a remote control signal having reached the head unit 1 first through the control bus 4, to a remote control signal having reached the head unit 1 through the control bus 4 subsequently, and then, to invalidate the subsequent remote control signal if the counter codes 23 satisfy the certain condition.

Figure 7B:
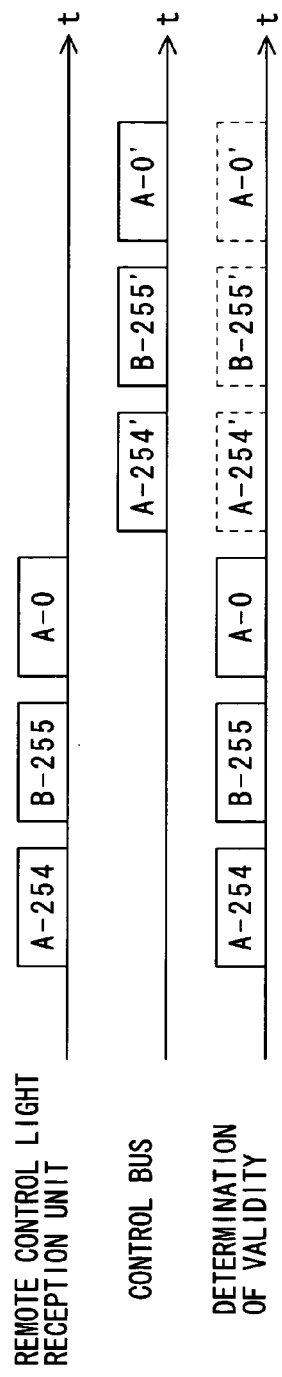

In the above embodiments, an example is described where the remote controllers 5 and 6 are respectively provided with one counter 12, and as shown in FIG. 7(b), a sequence of counts are added even if different keys 11 are operated (shown by reference numerals A and B). However, the keys 11 may have a respective counter different from each other.

In the above embodiments, an example is described where the head unit 1 and the television receiver 2 are respectively equipped with dedicated remote controllers 5 and 6. However, a single remote controller may be shared among the respective electronic devices, and a switch or the like may be used to select the electronic device to be operated.

In the above embodiments, an example is described where the apparatus for preventing malfunction of a remote controller is applied to the vehicle onboard apparatuses. However, the invention may be applied to home electronic devices installed indoors.

In addition, any of the above embodiments simply show specific examples for embodying the present invention, and should not be interpreted to restrict the technical scope of the present invention. Namely, the present invention may be embodied in various forms without departing from the spirit or essential characteristics thereof.

As described above, the present invention causes the remote control transmitter to generate a counter code whose value changes each time the key is operated and to transmit the remote control signal containing the counter code, and causes the electronic device which acquires the remote control signal to determine whether or not the counter code contained in the remote control signal satisfies a certain condition and to invalidate the remote control signal according to the determination result, thus preventing the malfunction of interpreting a single remote control operation as a plurality of remote control operations by mistake, without impairing the responsiveness of the remote controller.

What is claimed is:

1. An apparatus for preventing malfunction of a remote controller in a system including a plurality of electronic devices connected to a common control bus and mutually communicating a remote control signal with each other, the apparatus comprising:

a remote control signal acquisition unit for acquiring a remote control signal through a remote control light reception unit of an electronic device and from said control bus, the remote control signal containing a code indicating a requested operation and a counter code whose value changes each time a key of the remote controller is operated; and a remote control signal invalidation unit for, when said remote control signal acquisition unit acquires a remote control signal from said control bus, referring to the counter code contained in the remote control signal acquired from said control bus and to the counter codes contained in remote control signals previously acquired through the remote control light reception unit of the electronic device, determining whether or not these counter codes satisfy a certain condition, and carrying out processing for invalidating the remote control signal acquired from said control bus if these counter codes satisfy the certain condition;

wherein when said remote control signal acquisition unit acquires the remote control signal from said control bus, said remote control signal invalidation unit compares the counter code contained in the remote control signal acquired from said control bus to the counter codes respectively contained in "n" (where "n" is an arbitrary positive number equal to two or more) remote control signals acquired through the remote control light reception unit of the electronic device before the acquisition of the remote control signal acquired from said control bus, and invalidates the remote control signal acquired from said control bus if one of the previously acquired remote control signals contains the same counter code as the counter code contained in the remote control signal acquired from said control bus.

2. The apparatus for preventing malfunction of a remote controller according to claim 1, wherein when said remote control signal acquisition unit acquires said remote control signal from said control bus, said remote control signal invalidation unit compares the counter code contained in said remote control signal acquired from said control bus to the counter code contained in the remote control signal previously acquired, and invalidates the remote control signal acquired from said control bus if the counter code contained in the remote control signal acquired from said control bus and the counter code contained in the remote control signal previously acquired are the same.

3. The apparatus for preventing malfunction of a remote controller according to claim 1, wherein:

the value of said counter code is a count incremented by one each time the key of said remote controller is operated, and when said remote control signal acquisition unit acquires the remote control signal from said control bus, said remote control signal invalidation unit refers to a count C1 of the counter code contained in the remote control signal acquired from said control bus and to a count C2 of the counter code contained in the remote control signal previously acquired, and invalidates the remote control signal acquired from said control bus if said count C1 and said count C2 satisfy the condition: C2≧C1≧C2−n (where "n" is an arbitrary positive number).

4. The apparatus for preventing malfunction of a remote controller according to claim 1, wherein:
the value of said counter code is a count decremented by one each time the key of said remote controller is operated, and
when said remote control signal acquisition unit acquires the remote control signal from said control bus, said remote control signal invalidation unit refers to the count C1 of the counter code contained in the remote control signal acquired from said control bus and to the count C2 of the counter code contained in the remote control signal previously acquired, and invalidates the remote control signal acquired from said control bus if said count C1 and said count C2 satisfy the condition: C2≦C1≦C2+n (where "n" is an arbitrary positive number).

5. The apparatus for preventing malfunction of a remote controller according to claim 1, wherein when said remote control signal acquisition unit acquires the remote control signal from said control bus, only if the remote control signal is acquired from said control bus within a certain time period elapsing from the acquisition of the remote control signal previously acquired, said remote control signal invalidation unit determines whether or not these counter codes satisfy the certain condition and carries out the processing for invalidating the remote control signal acquired from said control bus.

6. An electronic device provided with a function of preventing malfunction of a remote controller, comprising:
a remote control light reception unit for receiving a remote control signal containing a code indicating a requested operation and a counter code whose value changes each time a key of the remote controller is operated;
a communication unit connected to a common control bus and communicating said remote control signal with other electronic devices through said control bus;
a remote control signal acquisition unit for acquiring a remote control signal through said remote control light reception unit and said communication unit; and
a remote control signal invalidation unit for, when said remote control signal acquisition unit acquires a remote control signal from said control bus, referring to the counter code contained in the remote control signal acquired from said control bus and to the counter codes contained in remote control signals previously acquired through the remote control light reception unit of the electronic device, determining whether or not these counter codes satisfy a certain condition, and carrying out processing for invalidating the remote control signal acquired from said control bus if these counter codes satisfy the certain condition;
wherein either the value of said counter code is a count incremented by one each time the key of said remote controller is operated, and said certain condition relating to the counter codes is that the count C1 of the counter code contained in the remote control signal acquired from said control bus and the count C2 of the counter code contained in the remote control signal previously acquired through the remote control light reception unit satisfy the condition: C2≧C1≧C2−n (where "n" is an arbitrary positive number), or the value of said counter code is the count decremented by one each time the key of said remote controller is operated, and said certain condition relating to the counter codes is that the count C1 of the counter code contained in the remote control signal acquired from said control bus and the count C2 of the said counter code contained in the remote control signal previously acquired through the remote control light reception unit satisfy the condition: C2≦C1≦C2+n (where "n" is an arbitrary positive number).

7. The electronic device provided with a function of preventing malfunction of a remote controller according to claim 6, wherein when said remote control signal acquisition unit acquires the remote control signal from said control bus, only if the remote control signal is acquired from said control bus within a certain time period elapsing from the acquisition of the remote control signal previously acquired, said remote control signal invalidation unit determines whether or not these counter codes satisfy the certain condition, and carries out the processing for invalidating the remote control signal acquired from said control bus if these counter codes satisfy the certain condition.

8. The electronic device provided with a function of preventing malfunction of a remote controller according to claim 6, wherein when said remote control signal acquisition unit acquires the remote control signal from said control bus, said remote control signal invalidation unit compares the counter code contained in the remote control signal acquired from said control bus to the counter codes respectively contained in "n" (where "n" is an arbitrary positive number) remote control signals acquired before the remote control signal acquired from said control bus is acquired, and carries out the processing for invalidating the remote control signal acquired from said control bus by determining whether or not a remote control signal containing the same counter code as the counter code contained in the remote control signal acquired from said control bus has previously been acquired.

9. A remote control transmitter for transmitting a remote control signal to a plurality of electronic devices that are connected to a common control bus and mutually communicate a remote control signal with each other, the remote control transmitter comprising:
a counter for generating a count which changes each time a key of the remote controller is operated; and
a remote control signal transmission unit for, if a key of said remote controller is operated, generating and transmitting a remote control signal containing a key code specifying the operated key and a counter code specifying the count generated by said counter;
wherein the data length of said counter code is set such that a time period required for successively operating a key of said remote controller a number of times equal to the maximum count represented by the data length is longer than the expected maximum transmission time required for said remote control signal to be transmitted from one electronic device to another electronic device through said control bus.

10. The remote control transmitter according to claim 9, wherein said counter either increments or decrements said count by one each time a key of said remote controller is operated.

11. A method for preventing malfunction of a remote controller used in a system in which a plurality of electronic devices are connected to a common control bus, at least one of said plurality of electronic devices is provided with a remote control light reception unit for receiving a remote control signal from a remote control transmitter, and said plurality of electronic devices mutually communicate said remote control signal with each other through said control bus, wherein:
- said remote control transmitter generates and transmits a remote control signal containing a code indicating a requested operation and a counter code whose value changes each time a key of the remote controller is operated, and
- when said electronic device acquires a remote control signal containing said counter code from said control bus, the counter code contained in said remote control signal acquired from said control bus and the counter codes contained in remote control signals previously acquired through the remote control light reception unit are referred to, it is determined whether or not these counter codes satisfy a certain condition, and processing is carried out for invalidating the remote control signal acquired from said control bus if these counter codes satisfy the certain condition;
- wherein when said electronic device acquires the remote control signal from said control bus, the counter code contained in the remote control signal acquired from said control bus and the counter codes respectively contained in "n" (where "n" is an arbitrary positive number equal to two or more) remote control signals acquired through the remote control light reception unit before the acquisition of the remote control signal acquired from said control bus are compared, and the processing for invalidating the remote control signal acquired from said control bus is carried out by determining whether or not a remote control signal containing the same counter code as the counter code contained in said remote control signal acquired from said control bus has previously been acquired through the remote control light reception unit.

12. The method for preventing malfunction of a remote controller according to claim 11, wherein when said electronic device acquires the remote control signal from said control bus, the counter code contained in the remote control signal acquired from said control bus and the counter code contained in the remote control signal previously acquired are compared with each other, and the remote control signal acquired from said control bus is invalidated if the counter code contained in the remote control signal acquired from said control bus and the counter code contained in the remote control signal previously acquired are the same.

13. The method for preventing malfunction of a remote controller according to claim 11, wherein:
- the value of said counter code is a count incremented by one each time a key of said remote control transmitter is operated, and
- when said electronic device acquires a remote control signal from said control bus, a count $C1$ of the counter code contained in the remote control signal acquired from said control bus and a count $C2$ of the counter code contained in the remote control signal previously acquired are referred to, and the remote control signal acquired from said control bus is invalidated if said count $C1$ and said count $C2$ satisfy the condition: $C2 \geq C1 \geq C2-n$ (where "n" is an arbitrary positive number).

14. The method for preventing malfunction of a remote controller according to claim 11, wherein:
- the value of said counter code is a count decremented by one each time a key of said remote control transmitter is operated, and
- when said electronic device acquires a remote control signal from said control bus, a count $C1$ of the counter code contained in the remote control signal acquired from said control bus and a count $C2$ of the said counter code contained in the remote control signal previously acquired are referred to, and the remote control signal acquired from said control bus is invalidated if said count $C1$ and said count $C2$ satisfy the condition: $C2 \leq C1 \leq C2+n$ (where "n" is an arbitrary positive number).

15. The method for preventing malfunction of a remote controller according to claim 11, wherein when said electronic device acquires the remote control signal from said control bus, only if the remote control signal is acquired from said control bus within a certain time period elapsing from the acquisition of the remote control signal previously acquired, the processing for invalidating the remote control signal acquired from said control bus is carried out by determining whether or not these counter codes satisfy the certain condition.

* * * * *